(12) United States Patent
Tsuji

(10) Patent No.: US 7,079,030 B2
(45) Date of Patent: Jul. 18, 2006

(54) MICROWAVE SENSOR

(75) Inventor: Masatoshi Tsuji, Ohtsu (JP)

(73) Assignee: Optex Co., Ltd., Shinga (JP)

( * ) Notice: Subject to any disclaimer, the term of this patent is extended or adjusted under 35 U.S.C. 154(b) by 0 days.

(21) Appl. No.: 10/739,007

(22) Filed: Dec. 19, 2003

(65) Prior Publication Data

US 2004/0222887 A1 Nov. 11, 2004

(30) Foreign Application Priority Data

May 7, 2003 (JP) ............................. 2003-129287

(51) Int. Cl.
*G08B 13/18* (2006.01)

(52) U.S. Cl. .................. 340/552; 342/27; 342/104; 342/111; 342/114

(58) Field of Classification Search ............... 340/552; 342/27, 28, 104, 108, 107, 111–114
See application file for complete search history.

(56) References Cited

U.S. PATENT DOCUMENTS

| | | | |
|---|---|---|---|
| 3,832,709 A * | 8/1974 | Klein et al. ................. 342/127 |
| 3,845,461 A | 10/1974 | Foreman | |
| 4,065,768 A | 12/1977 | Kondoh et al. | |
| 4,195,289 A | 3/1980 | Cole | |
| 4,286,260 A | 8/1981 | Gershberg et al. | |
| 6,380,882 B1 * | 4/2002 | Hegnauer ..................... 342/28 |
| 6,677,887 B1 * | 1/2004 | Harman ....................... 342/28 |
| 2002/0060639 A1 | 5/2002 | Harman | |

* cited by examiner

*Primary Examiner*—Jeffery Hofsass
*Assistant Examiner*—Samuel J Walk
(74) *Attorney, Agent, or Firm*—Wenderoth, Lind & Ponack, L.L.P.

(57) ABSTRACT

A microwave sensor transmits a plurality of microwaves having different frequencies to a detection area and performs an object detecting operation based on reflected waves of the microwaves of an object present in the detection area. The microwave sensor includes object determining means that determines whether or not the object present in the detection area is an object to be detected, based on a moving direction of the object in the detection area.

14 Claims, 8 Drawing Sheets

MICROWAVE SENSOR

BACKGROUND OF THE INVENTION

1. Field of the Invention

The present invention relates to measures for improving the reliability of microwave sensors (hereinafter, referred to as "MW sensor").

2. Description of the Related Art

MW sensors (first conventional MW sensors) that transmit microwaves to a detection area and detect an intruder by receiving reflected waves (microwaves modulated due to the Doppler effect) from the intruder when the intruder is present in the detection area have been known as a conventional crime prevention device (e.g., JP7-37176).

Furthermore, sensors that measure the distance to an object such as an intruder by utilizing a plurality of microwaves having different frequencies are also known as one type of MW sensors.

This type of MW sensors (second conventional MW sensors) transmit, for example, two kinds of microwaves having different frequencies to a detection area and detect a phase difference of the two IF (infrared, e.g. microwave) signals based on the respective reflected waves. This phase difference correlates with the distance to an object, and the larger the distance to an object is, the larger the phase difference is. In other words, the distance to an object can be measured by obtaining this phase difference.

Furthermore, it is possible to determine whether or not an object is moving in a detection area by identifying a temporal change of the phase difference. Thus, for example, only the object that is moving can be determined as an object to be detected. Hereinafter, the operation of detecting the phase difference of IF signals in this type of MW sensors (third conventional MW sensors) will be described.

In the case where the IF signals based on reflected waves of two microwaves having different frequencies have sine waves IFout 1 and IFout 2 (having a phase difference corresponding to the distance to an object) as shown in FIG. 8A, rectangular waves A and B that are shaped from these IF signals are such as those shown in FIG. 8B, respectively. Then, the distance to an object can be measured by detecting the phase difference between the rectangular waves A and B (phase difference Δt in the rising portions of the rectangular waves in FIG. 8B). Furthermore, it is possible to identify a movement of an object in a detection area (whether or not an object is approaching or going away from the MW sensor) by identifying a temporal change of the phase difference of these rectangular waves A and B.

However, there is the following problem when the third conventional MW sensor is used as a crime prevention sensor to identify a temporal change of the phase differences and determine only an object moving in a detection area as an object to be detected.

When the third conventional MW sensor is provided outdoors, the phase difference between the rectangular waves A and B can be generated by, for example, wavering of plants or the like by breeze, and thus it is possible to detect erroneously the plants or the like as an object to be detected (intruder). Similarly, when the third conventional MW sensor is provided indoors, the phase difference between the rectangular waves A and B (see FIG. 8) also can be generated by wavering of blinds or curtains due to a rotating operation of a fan for ventilation or breeze, so that also in this case, it is possible to detect erroneously objects other than an intruder as an object to be detected (intruder).

In order to solve the above problem, the present invention has an object of providing a MW sensor that determines correctly whether or not an object moving in the detection area is an object to be detected and eliminates detection errors.

SUMMARY OF THE INVENTION

In order to achieve the above-described object, a microwave sensor of the present invention transmits a plurality of microwaves having different frequencies to a detection area and performs an object detecting operation based on reflected waves of the microwaves from an object present in the detection area. The microwave sensor includes object determining means that determines whether or not the object present in the detection area is an object to be detected, based on a moving direction of the object in the detection area.

According to this embodiment of the present invention, object determining means is provided so that it is possible to determine whether or not the object in the detection area is an object to be detected, based on its moving direction. As a result, detection errors of objects can be eliminated. For example, when this MW sensor is applied to a sensor for crime prevention, it is possible to distinguish intruders to be detected from external frequency noise caused by, for example, plants, EMC (Electromagnetic Compatibility), fluorescent lamps or the like. Therefore, only intruders that intrude into the detection area can be detected correctly.

In the above configuration, the object determining means may be configured such that when movement amounts of an object moving to at least two different directions in the detection area are simultaneously detected, and the movement amounts of the object to at least two different directions are at least a first predetermined amount that has been previously set, then it is determined that the object is not an object to be detected.

In this case, the object determining means may be configured such that when movement amounts of an object moving to at least two different directions in the detection area are simultaneously detected, and the movement amounts of the object to at least two different directions are at least a first predetermined amount that has been previously set, then it is determined that the object is not an object to be detected. Therefore, for example, when the MW sensor of the present invention is applied to a sensor for crime prevention, it is possible to distinguish intruders from other objects having different movement amounts from that of intruders, because the intruders to be detected move in only one direction with a movement amount of the first predetermined amount or more. In this example, the first predetermined amount is set to be less than the movement amount of intruders.

In the above configuration, the object determining means may be configured such that when a movement of an object to only one direction in the detection area is detected, it is determined that the object is an object to be detected.

In this case, the object determining means may be configured such that when a movement of an object to only one direction in the detection area is detected, it is determined that the object is an object to be detected. Therefore, for example, when the MW sensor of the present invention is applied to a sensor for crime prevention, it is possible to distinguish intruders from other objects that move to a plurality of directions, unlike intruders, because the intruders to be detected move in only one direction.

In the above configuration, the object determining means may be configured such that when a movement amount of an object in the detection area is detected, and this movement amount is not more than a second predetermined amount, it is determined that the object is an object to be detected.

In this case, the object determining means may be configured such that when a movement amount of an object in the detection area is detected, and this movement amount is not more than a second predetermined amount, then it is determined that the object is an object to be detected. Therefore, for example, when the MW sensor of the present invention is applied to a sensor for crime prevention, it is possible to distinguish intruders to be detected from other objects that move with a movement amount exceeding the movement amount of a human being, unlike intruders.

More specifically, in the above configuration, it is preferable that the second predetermined amount is set to 10.0 m/s.

This configuration makes it possible so that the upper limit of the movement amount of human beings can be handled.

DETAILED DESCRIPTION OF THE PREFERRED EMBODIMENTS

Hereinafter, embodiments of the present invention will be described with reference to the accompanying drawings. In the following embodiments, the present invention is applied to a sensor for crime prevention as a MW sensor.

Figure 1:
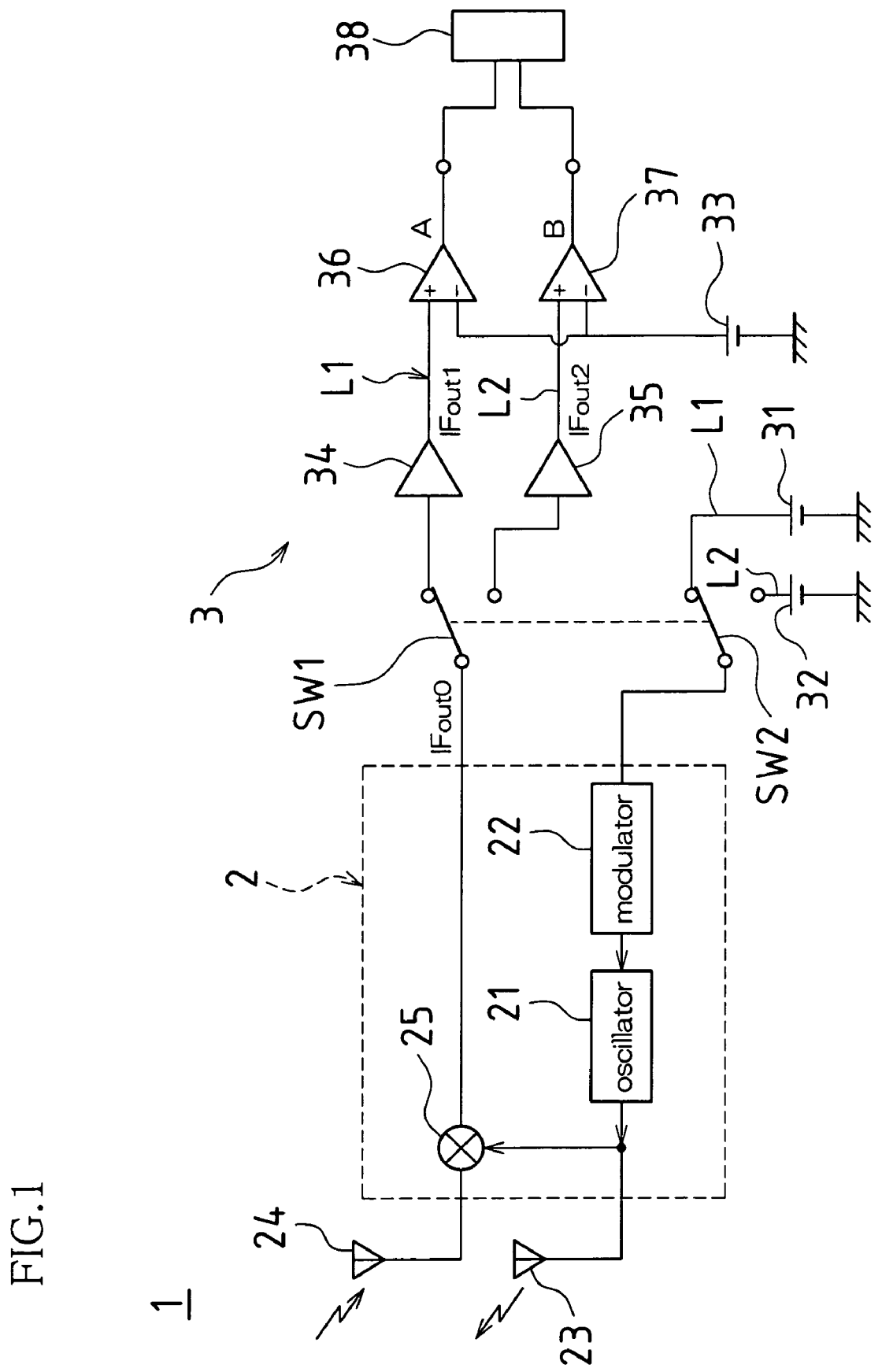
FIG. 1 is a diagram showing a circuit configuration of a MW sensor according to an embodiment of the present invention.

Referring to FIG. 1, a MW sensor 1 includes a RF module 2 for transmitting and receiving microwaves, and a signal processing portion 3 for processing signals of microwaves that are transmitted and received in the RF module 2.

The RF module 2 includes an oscillator 21 for oscillating two kinds of microwaves, a modulator 22 for switching the frequency of the microwaves that oscillate from the oscillator 21, a transmitting antenna 23 (transmitting means) for transmitting the microwaves that oscillate from the oscillator 21 to a detection area, a receiving antenna 24 (receiving means) for receiving reflected waves of the microwaves that are reflected by an object such as an intruder, and a mixer 25 for mixing the received microwaves and the voltage waveform of the oscillator 21 and outputting the result.

The RF module 2 operates in the following manner. The microwaves are transmitted from the transmitting antenna 23 to the detection area. When an intruder is present in a detection area, the frequency of the reflected waves from the intruder is modulated by the Doppler effect, and the reflected waves are received by the receiving antenna 24. The received reflected waves are mixed with the voltage waveform of the oscillator 21 by the mixer 25, and then an IF output signal (IFout 0) is output from the RF module 2 to the signal processing portion 3.

The signal processing portion 3 includes a first output line L1 and a second output line L2 that correspond to the microwaves of each frequency transmitted from the transmitting antenna 23.

Each line L1 or L2 includes powers 31, 32 and 33, IF amplifiers 34 and 35, and comparators 36 and 37. An object determining portion 38 (to which the object determining means of the present invention refers) is provided on the outputs of the comparators 36 and 37.

Each IF amplifier 34, 35 is connected to the output of the RF module 2 via a first switch SW1. The first switch SW1 is switched such that the first switch SW1 is connected to the first output line L1 when one of the two kinds of microwaves is transmitted from the transmitting antenna 23, whereas the first switch SW1 is connected to the second output line L2 when the other kind of microwaves are transmitted from the transmitting antenna 23. In other words, the IF signal (IFout 1) involved in the reflected waves that are reflected by an intruder at the time of transmitting one kind of microwaves is output to the first output line L1, and the IF signal (IFout 2) involved in the reflected waves that are reflected by an intruder at the time of transmitting the other kind of microwaves is output to the second output line L2.

The powers 31 and 32 are connected to the input of the RF module 2 via a second switch SW2 operating in cooperation with the first switch SW1. For this second switch SW2 as well, the connection state to each 31 and 32 can be switched depending on which kind of microwaves of the two kinds are transmitted from the transmitting antenna 23.

In other words, the modulator 22 switches the frequency of the microwaves, depending on the state where the second switch SW2 is connected to the power 31 or the other power 32. This switching switches the frequency of the microwaves transmitted from the transmitting antenna 23.

The signal processing portion 3 is configured such that a first processing operation and a second processing operation are switched with a predetermined time interval (e.g. several msec). The first processing operation is such that in response to the switching operation of the switches SW1 and SW2, the microwaves having one type of frequency are transmitted from the transmitting antenna 23 to the detection area, an IF output signal (IFout 1) based on the reflected waves thereof is output to the first output line L1 of the signal processing portion 3, and the signal is processed in the first output line L1. The second processing operation is such that the microwaves having the other type of frequency are transmitted from the transmitting antenna 23 to the detection area, an IF output signal (IFout 2) based on the reflected waves thereof is output to the second output line L2 of the signal processing portion 3, and the signal is processed in the second output line L2.

Each processing operation described above is configured such that the IF output signal output from the RF module 2 is amplified by the IF amplifiers 34, 35, and the output from the IF amplifier 34, 35 is shaped to a rectangular wave by the comparator 36, 37 and is then output to the object determining portion 38. Hereinafter, each processing operation will be described.

When no intruder is present in the detection area, the frequency of the microwaves transmitted from the transmitting antenna 23 is equal to that of the microwaves received by the receiving antenna 24. Therefore, the IF frequency in the output signal from the IF amplifier 34, 35 is "0", and no signal is output from the comparator 36, 37. On the other hand, when an intruder is present in the detection area, the frequency of the microwaves received by the receiving antenna 24 are modulated from the frequency of the microwaves transmitted from the transmitting antenna 23. Therefore, the output signal waveform of the comparator 36, 37 changes, and a rectangular wave thereof is output to the object determining portion 38.

Next, the object determining portion 38 that receives the output signal waveform from the comparator 36, 37 will be described.

The object determining portion 38 determines whether or not the object that is present in the detection area is an intruder to be detected, based on the direction in which the object is moving in the detection area.

More specifically, this object determining portion 38 is configured such that it is determined whether or not the object that is present in the detection area is an intruder, based on a relative moving distance of the detected object, and object detection signals are sent out only when the object is an intruder (a message is sent out).

In other words, the object determining portion 38 is configured so as to receive the output signal waveform of the comparator 36, 37, and determine that the object is an intruder only when it is detected that the object moves only in one direction in the detection area.

Furthermore, the object determining portion 38 is configured so as to receive the output signal waveform of each comparator 36, 37, measure the movement amount of an object in the detection area based on the output signal waveform, and determine that the object is an intruder when the movement amount thereof is not more than a second predetermined amount that has been previously set. The second predetermined amount herein is 10.0 m/s, because the MW sensor 1 of this embodiment is applied as a sensor for crime prevention. With this configuration, the upper limit of the movement amount of a human being can be handled.

Figure 2:
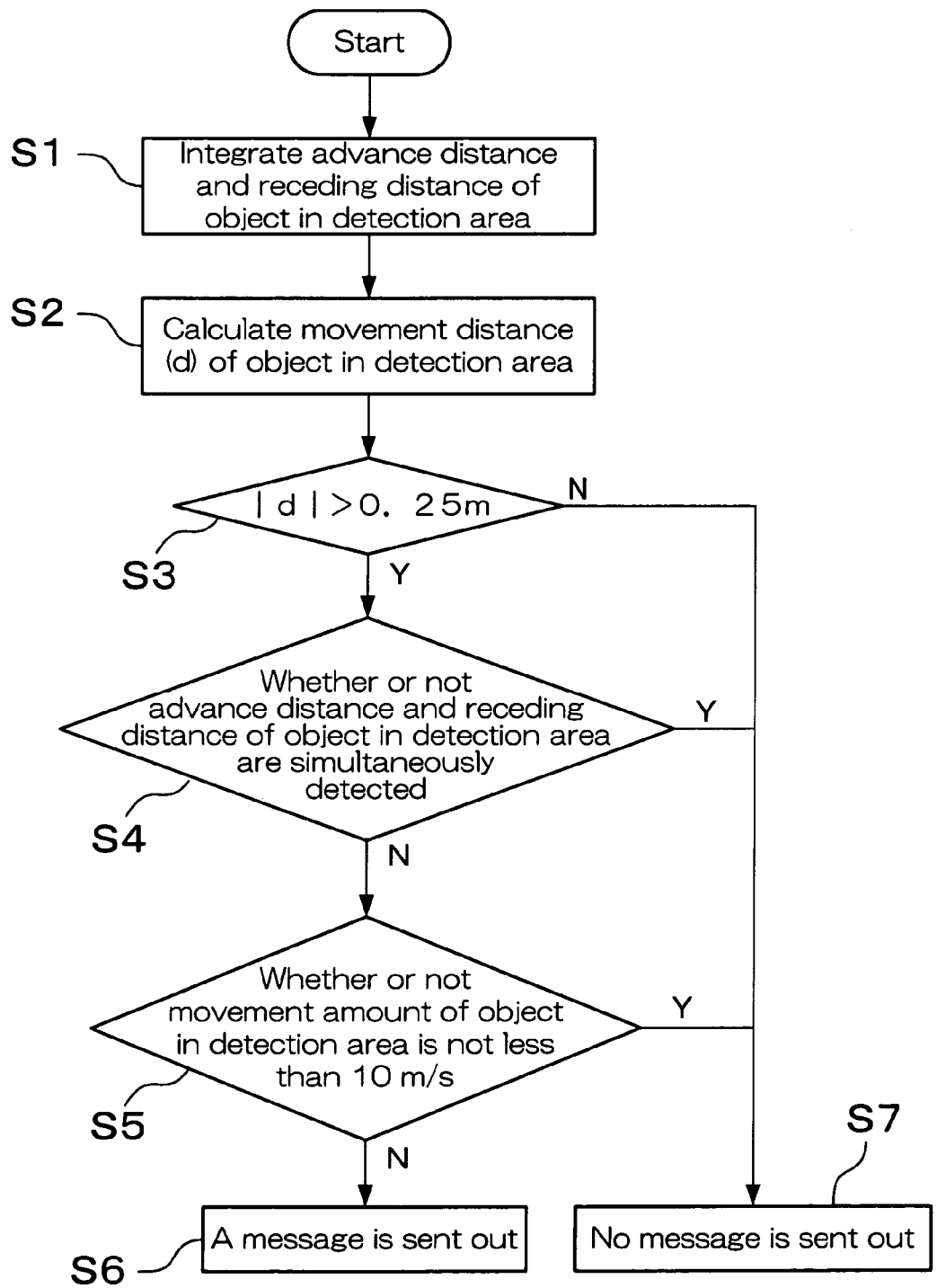
FIG. 2 is a flowchart showing a detecting operation in the object determining portion provided in the MW sensor according to an embodiment of the present invention.

Next, the detecting operation of the object determining portion 38 will be described with reference to FIG. 2. In the MW sensor 1 of this embodiment, the detection area is set such that a door of a house is provided on one end thereof. Therefore, in this embodiment, the direction toward to the door is taken as the advance direction in the detection area, and the opposite direction is taken as the receding direction. The movement distances of the object moving in the advance direction and in the receding direction are taken as the advance distance and the receding distance, respectively (see FIGS. 5, 6, and 7 described below).

First, the advance distance and the receding distance of the object in the detection area are integrated (step S1).

The advance distance and the receding distance in this step S1 are calculated from the relative distance from the MW sensor 1 to the object shown below (see equation 1 below).

$$R = c \cdot \Delta\phi / 4\pi \cdot \Delta f \qquad \text{Equation 1}$$

(R: relative distance to the object, c: velocity of light, $\Delta\phi$: phase difference between the rectangular waves A and B, and $\Delta f$: frequency difference between the two kinds of microwaves oscillating from the oscillator 21)

The distance to the object at every predetermined time is calculated based on Equation 1, and the change amount per unit time of the distance to the object is obtained. Then, the movement direction of the object is identified in the following manner.

The rectangular waves A and B of the two IF signal waveforms received from the comparators 36 and 37 are compared, and the degree of relative advance of the phases of these IF signal waveforms is identified, so that it can be determined whether the object in the detection area is moving in the direction in which the object is approaching the MW sensor 1 or in the direction in which the object is going away from thee MW sensor 1. Comparing the two IF signal waveforms, the IF signal waveform obtained by the reflected waves of the microwaves having a low frequency advances more than that which is obtained by the reflected waves of the microwaves having a high frequency, and therefore, it can be determined that the object in the detection area is moving in the direction in which the object is approaching the MW sensor 1. On the other hand, the IF signal waveform obtained by the reflected waves of the microwaves having a high frequency advances more than that which is obtained by the reflected waves of the microwaves having a low frequency, and therefore, it can be determined that the object in the detection area is moving in the direction in which the object is going away from the MW sensor 1. Hereinafter, this determining operation will be described.

Figure 3:
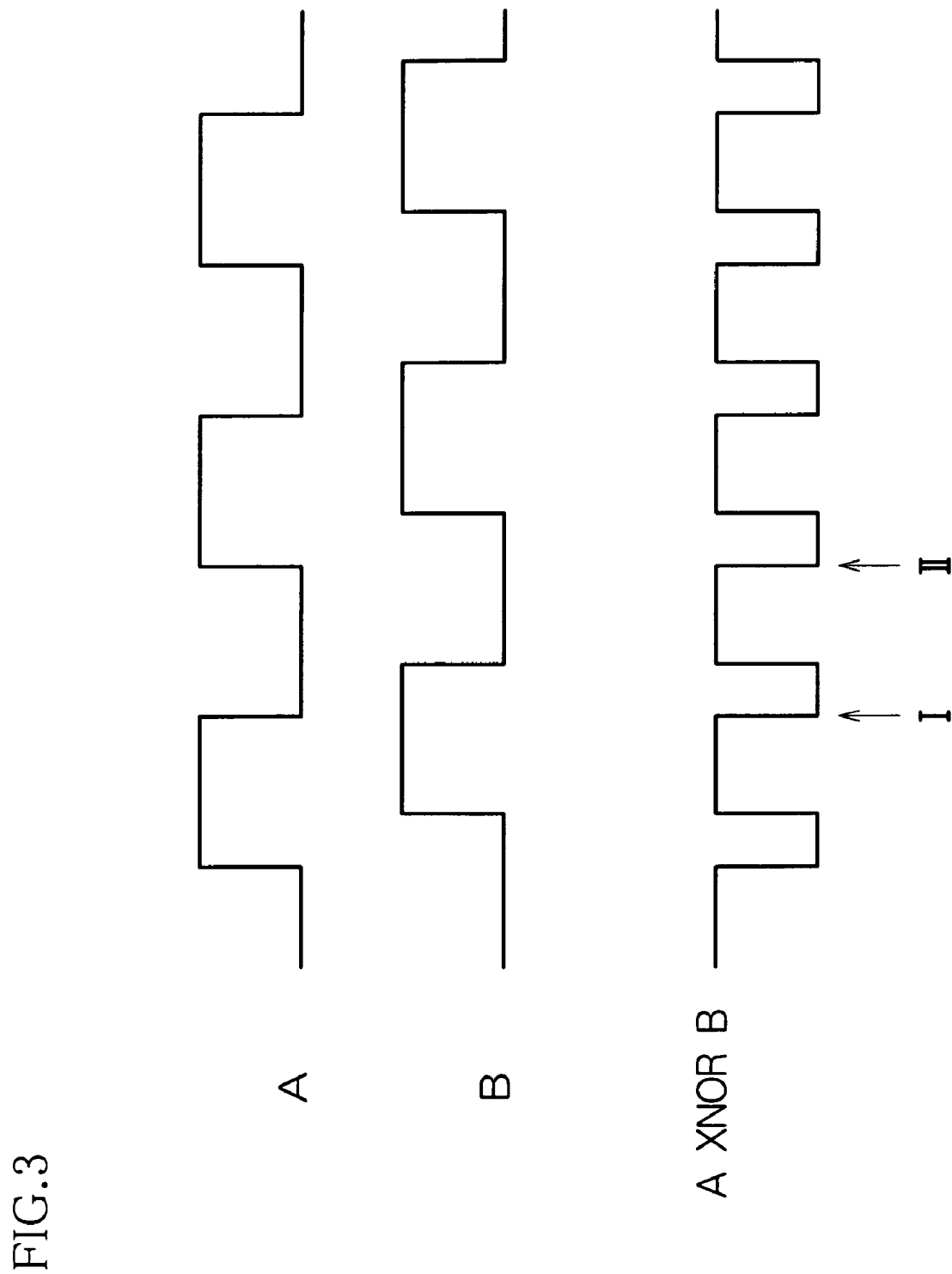
FIG. 3 is a diagram showing rectangular waves of two IF signals received from each comparator in the state where an object is approaching the MW sensor of an embodiment according to the present invention and their XNOR waveforms.

It is assumed that the rectangular waves of the two IF signal waveforms received from the comparators 36 and 37 are in the form of the waveforms A and B shown in FIG. 3. Then, a XNOR waveform (the waveform positioned lowest in FIG. 3) of these waveforms is shaped. Then, the values of the rectangular waves A and B of the IF signals at the time of switching between High and Low of the XNOR waveform and at the point of switching from High to Low (e.g., points indicated by arrows I and II in FIG. 3) are detected. In the case of FIG. 3, at the point of switching from High to Low (each of the two points indicated by arrows I and II), when the rectangular wave B is Low, the rectangular A is at the timing of switching from Low to High (arrow II), and when the rectangular wave B is High, the rectangular A is at the timing of switching from High to Low (arrow I). When this state is detected, it can be identified that the phase of the rectangular wave A of the IF signal waveform by the microwaves having a low frequency advances more that of the rectangular wave B of the IF signal waveform by the microwaves having a high frequency. In this case, it is determined that the object in the detection area is moving in the direction of approaching the MW sensor 1. At the point when the XNOR waveform switches from High to Low, the following is always the case: the rectangular wave B remains Low or High, and the rectangular wave A is at the timing of switching from High to Low or from Low to High. Therefore, it also can be determined that the object in the detection area is moving in the direction in which the object is approaching the MW sensor 1 by detecting ether one of the states of these rectangular waves A and B.

Figure 4:
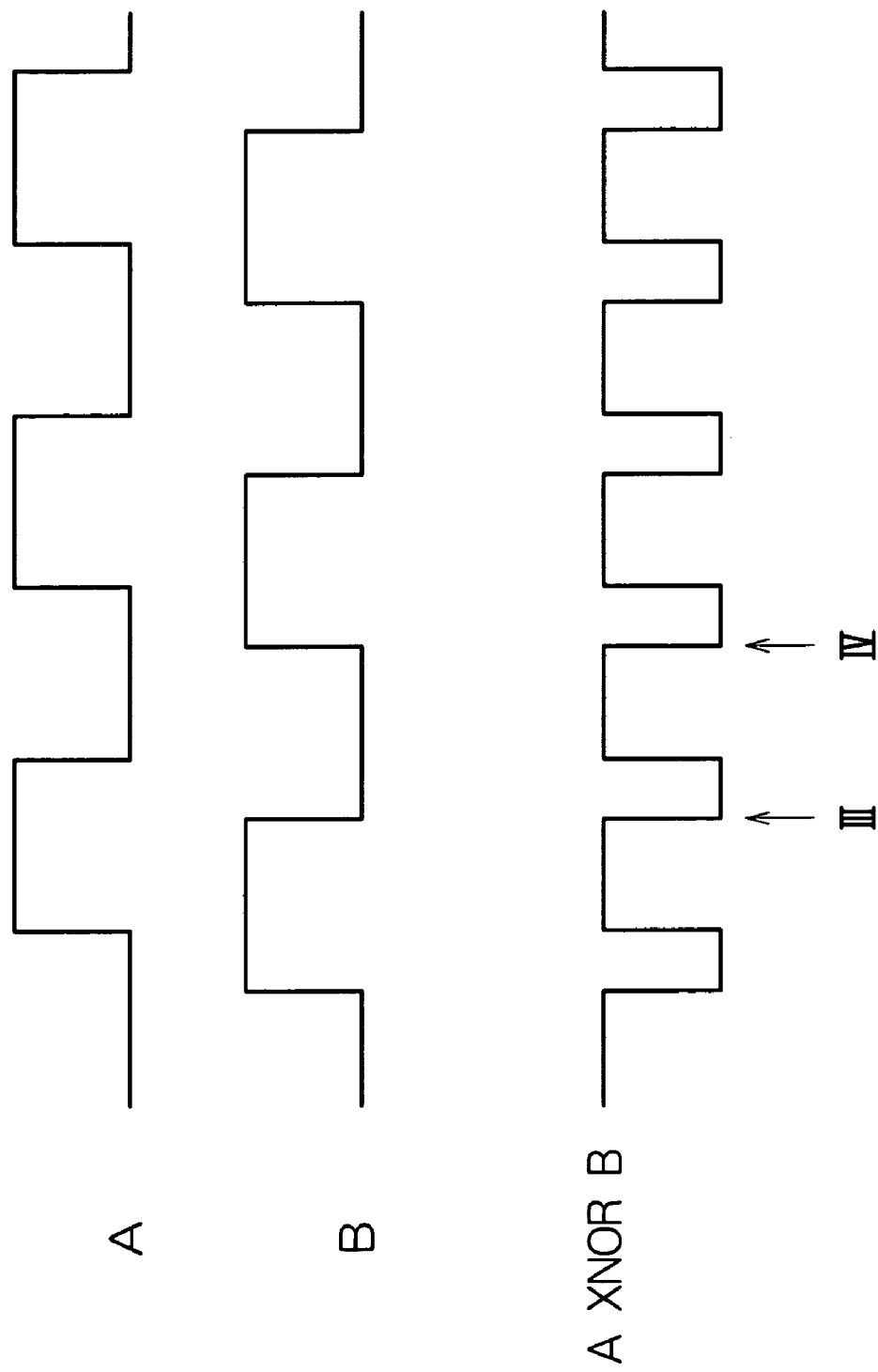
FIG. 4 is a diagram showing rectangular waves of two IF signals received from each comparator in the state where an object is going away from the MW sensor according to an embodiment of the present invention and their XNOR waveforms.

On the other hand, in the case where the rectangular waves of the two IF signal waveforms received from the comparators 36 and 37 are in the form of the waveforms A and B shown in FIG. 4, a XNOR waveform of these waveforms results in the waveform positioned lowest in FIG. 4. Then, the values of the rectangular waves A and B of the IF signals at the time of switching between High and Low of the XNOR waveform and at the point of switching from High to Low (e.g., points indicated by arrows III and IV in FIG. 4) are detected. In the case of FIG. 4, at the point of switching from High to Low (each of the two points indicated by arrows III and IV), when the rectangular wave A is Low, the rectangular B is at the timing of switching from Low to High (arrow IV), and when the rectangular wave A is High, the rectangular B is at the timing of switching from High to Low (arrow III). When this state is detected, it can be identified that the phase of the rectangular wave B of the IF signal waveform by the microwaves having a high frequency advances more that of the rectangular wave A of the IF signal waveform by the microwaves having a low frequency. In this case, it is determined that the object in the detection area is moving in the direction in which the object is going away from the MW sensor 1. At the point when the XNOR waveform switches from High to Low, the following is always the case: the rectangular wave A remains Low or High, and the rectangular wave B is at the timing of switching from High to Low or from Low to High. Therefore, it also can be determined that the object in the detection area is moving in the direction in which the object is going away from the MW sensor 1 by detecting ether one of the states of these rectangular waves A and B.

Next, the movement distance (d) of the object in the detection area is calculated based on the advance distance and the receding distance of the object that are integrated in step S1 (step S2). The movement distance (d) is calculated from equation 2 below.

$$d = \text{the advance distance of the object} - \text{the receding distance of the object} \quad \text{Equation 2}$$

It is examined whether or not the movement distance (d) of the object calculated in step S2 satisfies equation 3 shown below for one second (step S3).

$$|d| > 0.25 \quad \text{Equation 3}$$

When the equation 3 is not satisfied in step S3, it is determined that the object moving in the detection area is not an intruder, and a message is not sent out (step S7).

When the equation 3 is satisfied in step S3, it is examined whether or not the advance distance and the receding distance of the object in the detection area are simultaneously detected (step S4).

Figure 5:
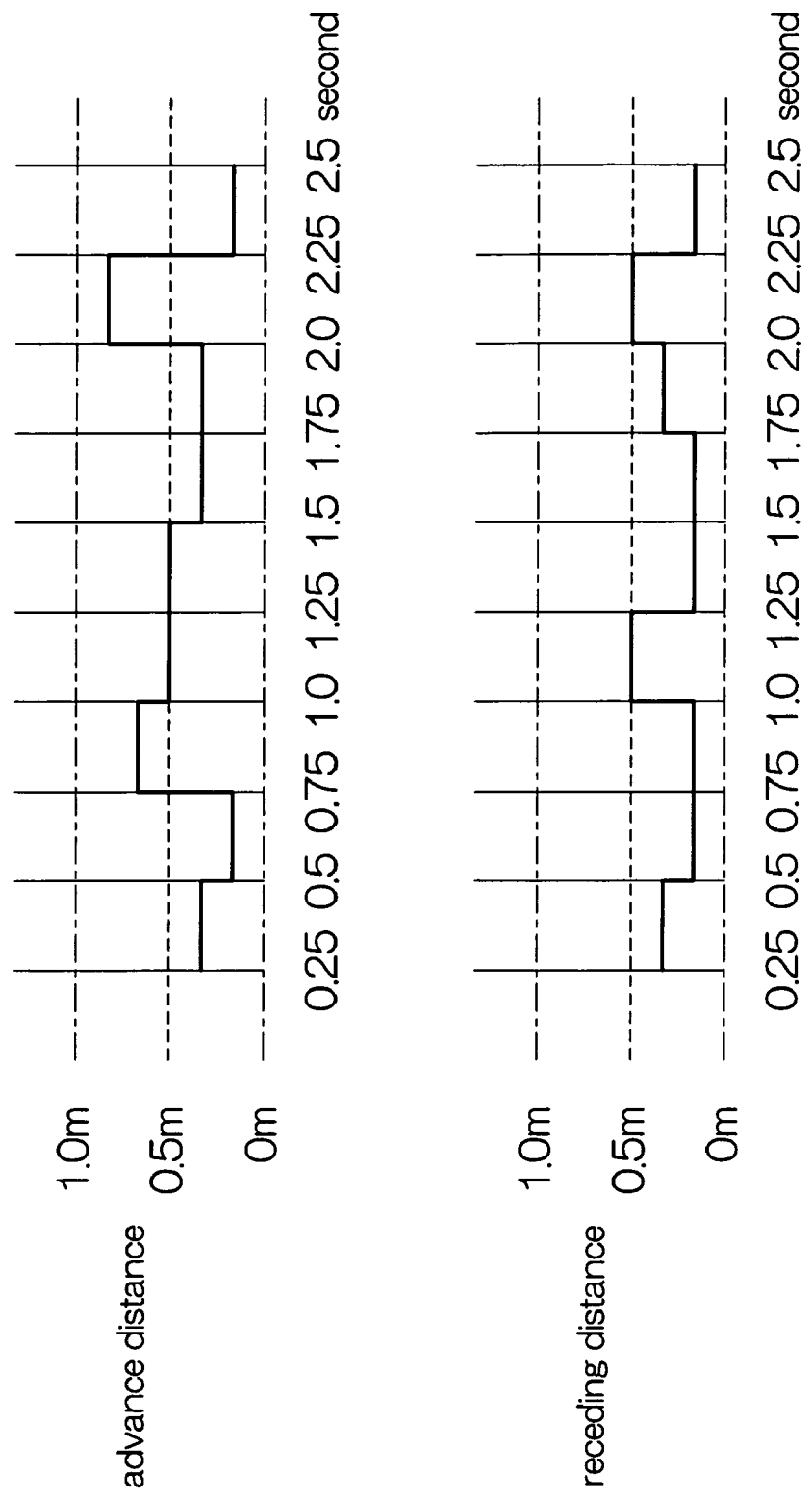
FIG. 5 is a diagram showing the case where the advance distance and the receding distance of an object in a detection area are simultaneously detected in a detecting operation of the object determining portion provided in the MW sensor according to an embodiment of the present invention.

In step S4, for example, as shown in FIG. 5, when the advance distance and the receding distance of the object in the detection area are simultaneously detected, then it is determined that the detected object is not an intruder but external frequency noise generated by, for example, plants wavering due to breeze, and a message is not sent out (step S7).

Figure 6:
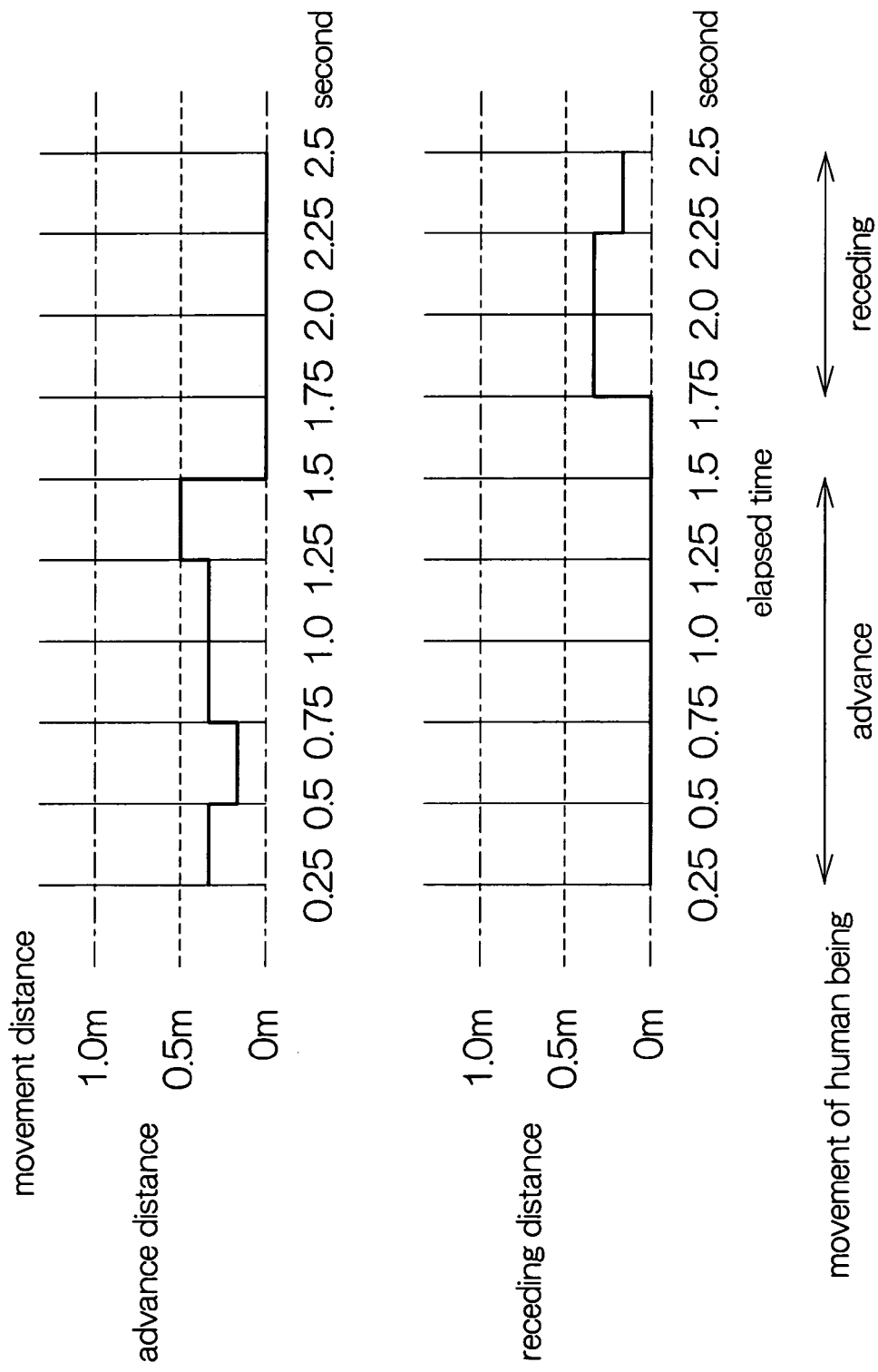
FIG. 6 is a diagram showing the case where the advance distance and the receding distance of an object in a detection area are not simultaneously detected in a detecting operation of the object determining portion provided in the MW sensor according to an embodiment of the present invention.

In step S4, for example, as shown in FIG. 6, when the advance distance and the receding distance of the object in the detection area are not simultaneously detected, then it is examined whether or not the movement amount of the object is at least 10 m/s (step S5).

In step S5, the movement amount of the object is measured from equations 4 and 5 below.

$$n = fd \cdot t \quad \text{Equation 4}$$

$$v = fd \cdot c/2 \cdot f0 = n \cdot c/2 f0 \cdot t \quad \text{Equation 5}$$

(fd: Doppler frequency, f0: RF frequency, c: velocity of light, n: Doppler signal count number, and v: movement amount of the object)

When the movement amount of the object examined in step S5 is less than 10 m/s, it is determined that the detected object is an intruder and a message is sent out (step S6).

Figure 7:
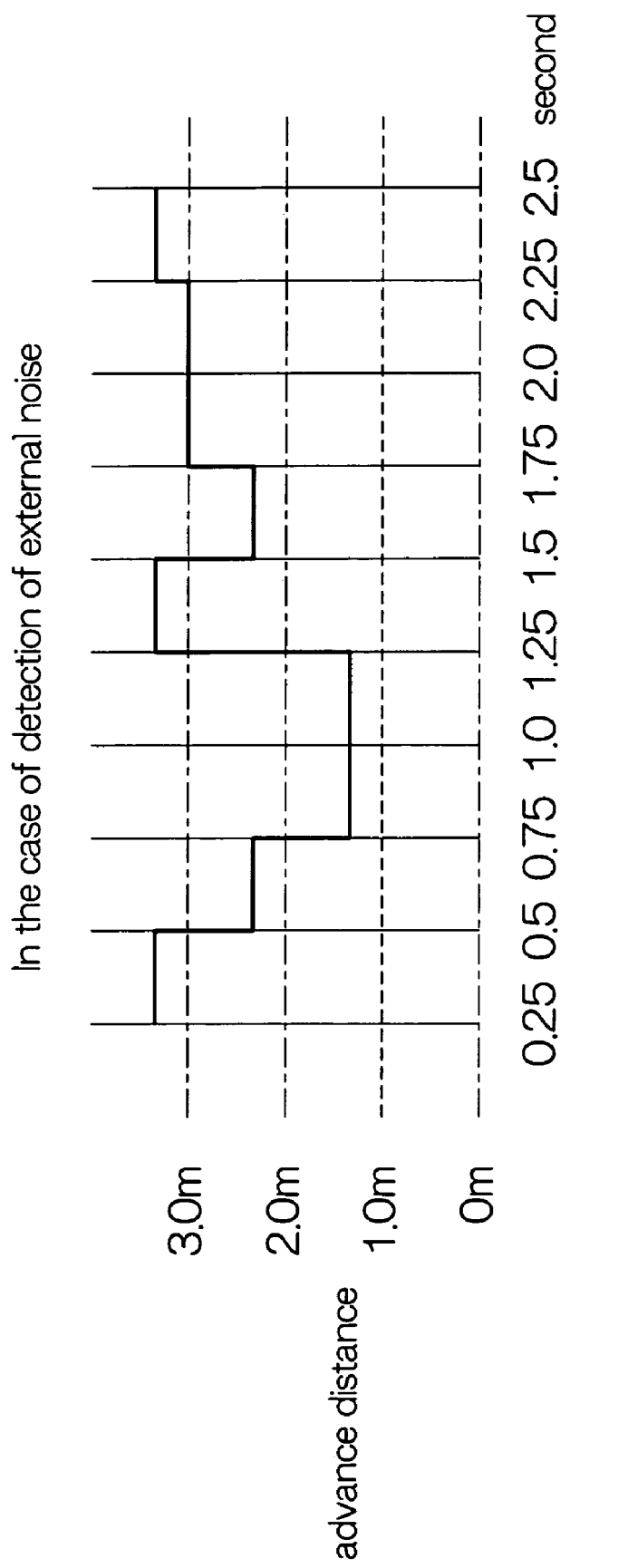
FIG. 7 is a diagram showing the case where the movement amount of the measured object is 10 m/s or more in a detecting operation of the object determining portion provided in the MW sensor according to an embodiment of the present invention.
Figure 8:
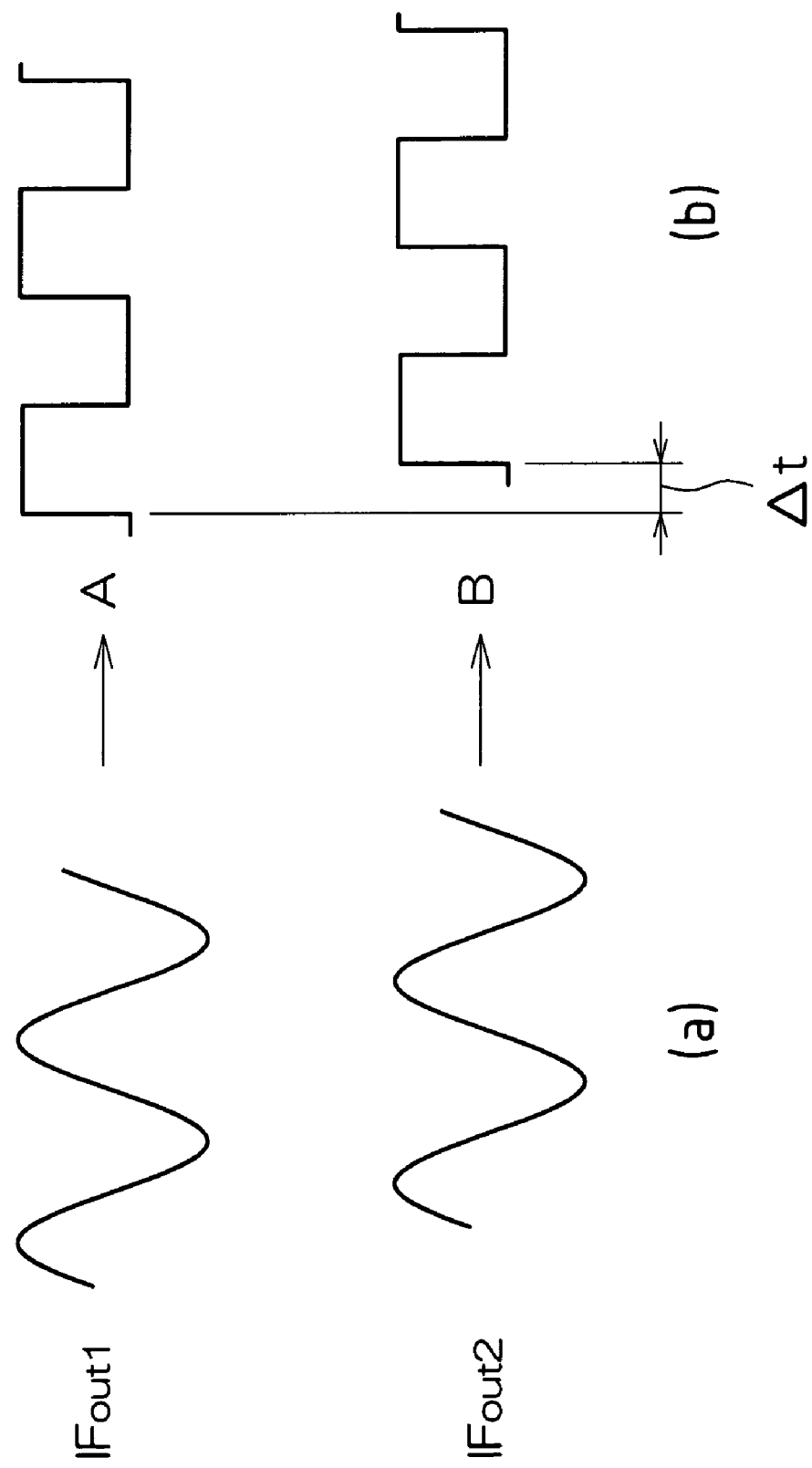
FIG. 8 is a diagram showing IF signals in the conventional MW sensors and rectangular waves obtained thereby.

In step S5, for example, as shown in FIG. 7, when the movement amount of the object examined is at least 10 m/s, it is determined that the detected object is not an intruder and a message is not sent out (step S7). In the example shown in FIG. 7, when the movement amount is measured to be 2.5 m or more in at least one time zone set at every 0.25 seconds, it is determined that the object in the detection area is external frequency noise such as EMC or fluorescent lamps.

Thus, the moving direction and the moving speed of the object that is present in the detection area are measured, the movement distance and the movement amount of the object relative to the MW sensor 1 are detected, and then it is determined based on these results whether or not the object moving in the detection area is an intruder.

As described above, according to the MW sensor 1 of the present invention, since the object determining portion 38 is provided, it can be determined based on the moving direction whether or not the object in the detection area is an intruder, and as a result, the error of detecting an intruder can be eliminated. In other words, this MW sensor 1 can distinguish intruders from external frequency noise caused by, for example, plants, EMC, or fluorescent lamps. Therefore, only intruders that intrude into the detection area can be detected correctly.

Furthermore, the object determining portion 38 is configured such that when a movement of an object in only one direction in the detection area is detected, it is determined that the object is an intruder to be detected. Therefore, intruders can be distinguished from other objects that move to a plurality of directions, unlike intruders, who move in only one direction.

Furthermore, the object determining portion 38 is configured such that when the movement amount of an object in the detection area is detected and this movement amount is not more than the second predetermined amount that has been previously set, then it is determined that the object is an intruder to be detected. Therefore, intruders can be distinguished from other objects that move with a movement amount exceeding the movement amount of intruders, unlike intruders.

In this embodiment, the object determining portion 38 is configured such that when a movement of an object in only one direction in the detection area is detected, then it is determined that the object is an intruder to be detected. However, the present invention is not limited thereto. For example, the object determining portion 38 can be configured such that when movement amounts of an object moving to at least two different directions in the detection area are simultaneously detected, and the movement amounts of the object moving to at least two different directions are at least the first predetermined amount that has been previously set, then it is determined that the object is not an intruder to be detected. The first predetermined amount herein is set to be less than the movement amount of intruders, and in this example, the first predetermined amount corresponds to the movement amount of plants.

In this case, since intruders moving with a movement amount of the first predetermined amount or more to be detected move in only one direction, when the first predetermined amount is set to, for example, the wavering amount of plants wavering due to breeze, intruders can be distinguished more correctly from plants moving with a movement amount of less than the first predetermined amount to a plurality of directions. In this example, the first predetermined amount corresponds to the movement amount of plants, but the present invention is not limited thereto.

Furthermore, in this embodiment, the second predetermined amount is set to 10.0 m/s, but the present invention is not limited thereto, and any amount can be set for the second predetermined amount.

Furthermore, in this embodiment, the MW sensor 1 that measures the distance to an object by utilizing two kinds of microwaves having different frequencies has been described. The present invention is not limited thereto, and the distance to an object can be measured by utilizing there or more kinds of microwaves having different frequencies.

Furthermore, this embodiment has been described by taking, as an example, external frequency noise by plants, EMC or fluorescent lamps as objects not to be detected. However, the present invention is not limited thereto, and in the situation where blinds or curtains are wavering due to breeze or the situation where a fan for ventilation is rotating, these objects can be identified as objects not to be detected.

Furthermore, in this embodiment, the MW sensor 1 is used as a sensor for crime prevention, but the present invention is not limited thereto, and can be applied to sensors for applications other than a sensor for crime sensor.

As described above, according to the MW sensor of the present invention, it can be determined correctly whether or not an object moving in the detection area is the object to be detected and detection errors can be eliminated. Therefore, the MW sensor of the present invention can be used effectively as a sensor for crime prevention, and incorrect alarming can be prevented.

In other words, the MW sensor of the present invention is provided with the object determining portion, so that it can be determined whether or not the object in the detection area is an object to be detected, based on its moving direction. As a result, the detection error of objects can be eliminated. Therefore, when this MW sensor is applied to a sensor for crime prevention, intruders to be detected can be distinguished from external frequency noise caused by, for example, plants, EMC or fluorescent lamps. As a result, only intruders that intrude into the detection area can be detected correctly.

The application of the present invention is based on Japanese Patent Application 2003-129287 filed with the Japanese Patent Office and is incorporated by reference herein. The references cited in this specification are entirely incorporated by reference herein.

What is claimed is:

1. A microwave sensor comprising:
    transmitting means for transmitting a plurality of microwaves having different frequencies to a detection area;
    receiving means for receiving reflected waves of the microwaves reflected from the detection area;
    object detecting means for detecting if an object is present in the detection area based on the reflected waves; and
    object determining means for determining whether or not the object detected as being present in the detection area is an object to be detected based on a moving direction of the object in the detection area;
    wherein said object determining means determines that the object present in the detection area is not an object to be detected when movement amounts of the object moving to at least two different directions in the detection area are simultaneously detected, and the movement amounts of the object to the at least two different directions are at least a first predetermined amount that has been previously set; and
    wherein said object determining means calculates the movement amounts of the object to the at least two different directions by integrating an advance distance in the detection area and a receding distance in the detection area.

2. The microwave sensor according to claim 1, wherein:
    said object determining means calculates the movement amounts of the object present in the detection area by determining an amount of movement of the object in the advance distance of the detection area, determining an amount of movement of the object in the receding distance of the detection area, and subtracting the receding distance of movement of the object from the advance distance of movement of the object; and
    the first predetermined amount is set to be 0.25 m.

3. The microwave sensor according to claim 2, wherein said object determining means determines that the object preset in the detection area is an object to be detected when at least one of the movement amounts of the object is detected in the detection area, and a rate of the detected movement amount is not more than a second predetermined amount.

4. The microwave sensor according to claim 2, wherein said object determining means determines that the object preset in the detection area is an object to be detected when at least one of the movement amounts of the object is detected in the detection area, and a rate of the detected movement amount is not more than an amount of 10.0 m/s.

5. The microwave sensor according to claim 1, wherein said object determining means determines that the object present in the detection area is an object to be detected when a movement of the object to only one direction in the detection area is detected.

6. The microwave sensor according to claim 5, wherein said object determining means determines that the object preset in the detection area is an object to be detected when at least one of the movement amounts of the object is detected in the detection area, and a rate of the detected movement amount is not more than a second predetermined amount.

7. The microwave sensor according to claim 5, wherein said object determining means determines that the object preset in the detection area is an object to be detected when at least one of the movement amounts of the object is detected in the detection area, and a rate of the detected movement amount is not more than an amount of 10.0 m/s.

8. A microwave sensor operable to transmit a plurality of microwaves having different frequencies to a detection area, and to perform an object detection operation for detecting whether an object is present in the detection area based on reflected waves of the microwaves, said microwave sensor comprising:
    an object detecting portion operable to determine whether or not an object present in the detection area is an object to be detected based on a moving direction of the object in the detection area;

wherein said object determining portion is operable to determine that the object present in the detection area is not an object to be detected when movement amounts of the object moving to at least two different directions in the detection area are simultaneously detected, and the movement amounts of the object to the at least two different directions are at least a first predetermined amount that has been previously set; and wherein said object determining portion is operable to calculate the movement amounts of the object to the at least two different directions by integrating an advance distance in the detection area and a receding distance in the detection area.

9. The microwave sensor according to claim 8, wherein:
said object determining portion is operable to calculate the movement amounts of the object present in the detection area by determining an amount of movement of the object in the advance distance of the detection area, determining an amount of movement of the object in the receding distance of the detection area, and subtracting the receding distance of movement of the object from the advance distance of movement of the object; and the first predetermined amount is set to be 0.25 m.

10. The microwave sensor according to claim 9, wherein said object determining portion is operable to determine that the object preset in the detection area is an object to be detected when at least one of the movement amounts of the object is detected in the detection area, and a rate of the detected movement amount is not more than a second predetermined amount.

11. The microwave sensor according to claim 9, wherein said object determining portion is operable to determine that the object preset in the detection area is an object to be detected when at least one of the movement amounts of the object is detected in the detection area, and a rate of the detected movement amount is not more than an amount of 10.0 m/s.

12. The microwave sensor according to claim 8, wherein said object determining portion is operable to determine that the object present in the detection area is an object to be detected when a movement of the object to only one direction in the detection area is detected.

13. The microwave sensor according to claim 12, wherein said object determining portion is operable to determine that the object preset in the detection area is an object to be detected when at least one of the movement amounts of the object is detected in the detection area, and a rate of the detected movement amount is not more than a second predetermined amount.

14. The microwave sensor according to claim 12, wherein said object determining portion is operable to determine that the object preset in the detection area is an object to be detected when at least one of the movement amounts of the object is detected in the detection area, and a rate of the detected movement amount is not more than an amount of 10.0 m/s.

* * * * *